(12) United States Patent
Haulick et al.

(10) Patent No.: US 8,111,840 B2
(45) Date of Patent: Feb. 7, 2012

(54) ECHO REDUCTION SYSTEM

(75) Inventors: Tim Haulick, Blaubeuren (DE);
Gerhard Uwe Schmidt, Ulm (DE);
Martin Roessler, Ulm (DE)

(73) Assignee: Nuance Communications, Inc.,
Burlington, MA (US)

( * ) Notice: Subject to any disclaimer, the term of this patent is extended or adjusted under 35 U.S.C. 154(b) by 1268 days.

(21) Appl. No.: 11/788,069

(22) Filed: Apr. 18, 2007

(65) Prior Publication Data

US 2008/0031467 A1 Feb. 7, 2008

(30) Foreign Application Priority Data

May 8, 2006 (EP) .................................... 06009468

(51) Int. Cl.
*H04B 15/00* (2006.01)
*H04R 3/00* (2006.01)
*H04R 27/00* (2006.01)
*H04R 25/00* (2006.01)
*G10L 15/20* (2006.01)

(52) U.S. Cl. ................ 381/93; 381/95; 381/96; 381/83; 381/318; 704/233

(58) Field of Classification Search .................... 381/66, 381/83, 93, 95–96, 121, 318; 704/233
See application file for complete search history.

(56) References Cited

U.S. PATENT DOCUMENTS

| | | | |
|---|---|---|---|
| 6,049,607 A | 4/2000 | Marash et al. | 379/410 |
| 6,421,377 B1 | 7/2002 | Langberg et al. | 375/222 |
| 6,442,275 B1 | 8/2002 | Diethorn | |
| 6,510,225 B1 | 1/2003 | Robertson et al. | 379/406.1 |
| 6,738,480 B1 | 5/2004 | Berthault et al. | 381/66 |
| 6,839,426 B1 | 1/2005 | Kamoi et al. | 379/406.01 |
| 6,895,095 B1 | 5/2005 | Thomas | 381/94.7 |
| 7,068,798 B2 * | 6/2006 | Hugas et al. | 381/93 |
| 2002/0176585 A1 | 11/2002 | Egelmeers et al. | 381/71.11 |
| 2003/0021389 A1 | 1/2003 | Hirai et al. | 379/3 |

(Continued)

FOREIGN PATENT DOCUMENTS

EP 1 404 147 A2 3/2004

(Continued)

OTHER PUBLICATIONS

Gänsler, et al., "An Adaptive Nonlinearity Solution to the Uniqueness Problem of Stereophonic Echo Cancellation," *IEEE*, Murray Hill, New Jersey, pp. 1885-1888, 2002.

(Continued)

*Primary Examiner* — Devona Faulk
*Assistant Examiner* — George Monikang
(74) *Attorney, Agent, or Firm* — Sunstein Kann Murphy & Timbers LLP (57) ABSTRACT

A system for reducing an echo and/or a residual echo in a microphone output signal includes an echo compensation filter configured to receive audio input signals and generate an estimated echo signal. A speech activity detector is configured to detect speech of a local speaker, and a combining circuit is configured to generate an echo compensated signal by subtracting the estimated echo signal from the microphone output signal. A residual echo reduction circuit is configured to suppress the residual echo in the echo compensated signal based on the detected speech activity, and output an echo suppressed output signal. The echo reduction system may reduce local background noise and residual echoes in a microphone output signal so that local speech may be transmitted free from undesirable signals.

22 Claims, 8 Drawing Sheets

U.S. PATENT DOCUMENTS

| | | |
|---|---|---|
| 2003/0091182 A1 | 5/2003 | Marchok et al. |
| 2003/0185402 A1 | 10/2003 | Benesty et al. ............. 381/66 |
| 2003/0235312 A1* | 12/2003 | Pessoa et al. ............. 381/66 |
| 2004/0018860 A1 | 1/2004 | Hoshuyama |
| 2004/0125942 A1 | 7/2004 | Beaucoup et al. ....... 379/406.01 |
| 2005/0213747 A1 | 9/2005 | Popovich et al. ........ 379/406.03 |
| 2006/0018459 A1 | 1/2006 | McCree |
| 2006/0062380 A1 | 3/2006 | Kim et al. ............. 379/406.01 |
| 2006/0067518 A1 | 3/2006 | Klinke et al. ........... 379/406.01 |
| 2006/0233353 A1 | 10/2006 | Beaucoup et al. ....... 379/406.01 |
| 2007/0093714 A1 | 4/2007 | Beaucoup ................ 600/437 |

FOREIGN PATENT DOCUMENTS

| | | |
|---|---|---|
| EP | 1 406 397 A1 | 4/2004 |
| JP | 09-307625 | 11/1997 |
| JP | 10-023172 | 1/1998 |
| JP | 2003-506924 | 2/2003 |
| JP | 2003-264483 A | 9/2003 |
| WO | WO 93/17510 | 9/1993 |
| WO | 01/10102 A2 | 2/2001 |

OTHER PUBLICATIONS

Schmidt, et al., "Signal Processing for In-Car Communication Systems," *Elsevier*, pp. 1307-1326, 2005.

Benesty, et al., "A Hybrid Mono/Stereo Acoustic Echo Canceler," *IEEE Transactions on Speech and Audio Processing*, vol. 6, No. 5, pp. 468-475, Sep. 1988.

Kuo, et al., "Acoustic Noise and Echo Cancellation Microphone System for Videoconferencing," *IEEE Transactions on Consumer Electronics*, No. 4, pp. 1150-1158, Nov. 1995.

Sondhi, et al., "Adaptive Echo Cancellation for Speech Signals," pp. 327-356, 1991.

Storn, R. "Echo Cancellation Techniques for Multimedia Applications—a Survey," pp. 1-53, Nov. 1996.

\* cited by examiner

ECHO REDUCTION SYSTEM

BACKGROUND OF THE INVENTION

1. Priority Claim

This application claims the benefit of priority from European Patent Application No. 06 009468.7, filed May 8, 2006, which is incorporated by reference.

2. Technical Field

This disclosure relates to echo reduction. In particular, this disclosure relates to echo reduction and suppression of residual echo signals in communication systems.

3. Related Art

Echo reduction or suppression may be needed in communication systems, such as hands-free sets and speech recognition systems. Communication systems may include a microphone that detects a desired signal, such as a speech signal from a user. However, the microphone may also detect undesirable signals, such as echoes produced by a loudspeaker in the audio environment.

Echoes may occur when signals transmitted by a remote party and received by a near-end are output by loudspeakers at the near end. Such signals may be detected by the near-end microphone and re-transmitted back to the remote party. Echoes may be annoying to the user and may result in a communication failure.

Echo suppression may be particularly difficult if the speaker is moving, such as when a driver is using a hands-free set and also steers a vehicle. In this situation, an impulse response of the "loudspeaker-room-microphone" (LRM) environment may be time-variant. Existing echo suppression systems may be unreliable and may not be particularly effective in a time-varying LRM environment. After application of echo suppression techniques, residual echoes may be present. The severity of the residual echoes may be increased by the large delay paths associated with mobile phone services. Accordingly, a need exists for an echo reduction system capable of reducing echoes and residual echoes.

SUMMARY

A filter bank may separate a microphone output signal into sub-band microphone signals. An audio input filter bank may separate audio input signals into of sub-band audio signals. An echo compensation filter receives the audio input signals from each sub-band range and may generate a corresponding estimated echo signal. A speech activity detector may detect the speech of a local speaker by analyzing the power spectrum. The estimated echo signal may be subtracted from the microphone output signal to compensate for echoes. A residual echo reduction circuit may remove any residual echoes in the echo compensated signal based on speech activity.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
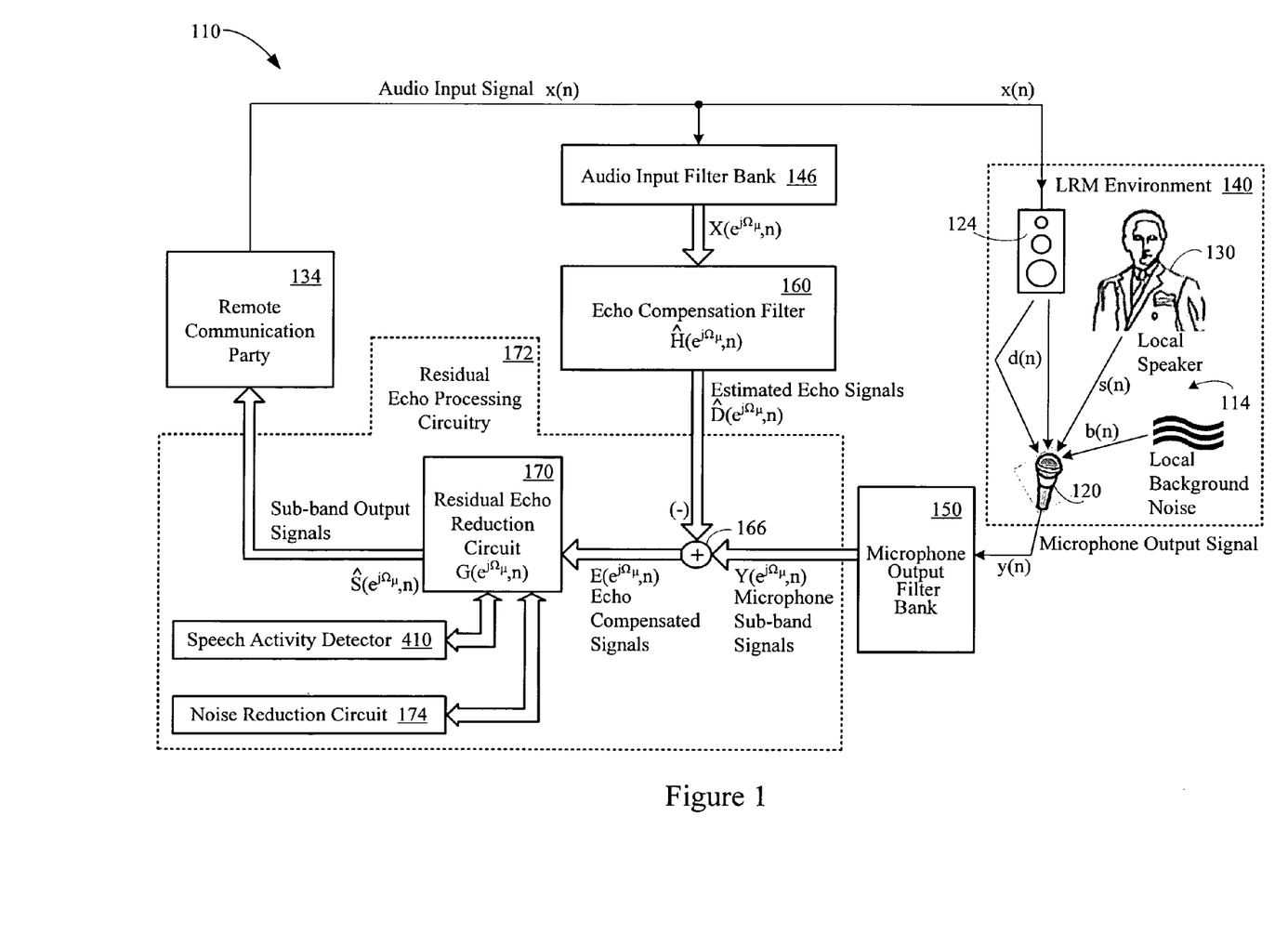
FIG. 1 is an echo reduction system.

FIG. 1 is an echo reduction system 110. A telephony hands-free set 114 may include a microphone 120 and a loudspeaker 124. Utterances from a local speaker 130 may be detected by the microphone 120 and may be transmitted to a remote communication party 134. The loudspeaker 124 may generate a loudspeaker signal based on an audio input signal x(n) transmitted by a remote communication party 134.

The microphone 120 may detect undesirable signals, such as echo signals produced by the loudspeaker 124. Echoes may occur when signals transmitted by the remote communication party 134 are output by loudspeakers at the near end, and retransmitted via the microphone back to the remote communication party 134. Such echoes may occur in various speech recognition systems or speech dialog systems.

The microphone 120 may detect speech signals s(n) of the local speaker 130 as well as background noise signals b(n). The microphone 120 may further detect a "loudspeaker-room-microphone" (LRM) transfer signal d(n) based on an impulse response h(n) of a LRM environment or system 140. A microphone output signal y(n) may include contributions from the speech signal s(n), the background noise signal b(n) and the LRM transfer signal d(n). The term "n" may denote a discrete time index.

The echo reduction system 110 may provide echo compensation and residual echo suppression. Echo compensation may be performed by an adaptive echo compensation filtering system that may model the loudspeaker-room-microphone system transfer function using an impulse response. Such processing may be performed by dividing the signal spectrum into sub-bands and processing each sub-band separately. Alternatively, the input signals my be processed in the frequency domain using Fast Fourier Transforms of the respective audio input signal x(n) and the microphone output signal y(n).

An audio input filter bank 146 may generate a plurality of sub-band audio signals $X(e^{j\Omega_\mu}, n)$ based on the audio input signal x(n). A microphone output filter bank 150 may generate a plurality of microphone sub-band signals $Y(e^{j\Omega_\mu}, n)$ based on the microphone output signal y(n). The mid-frequency μ of each sub-band may be denoted by $\Omega_\mu$.

Figure 2:
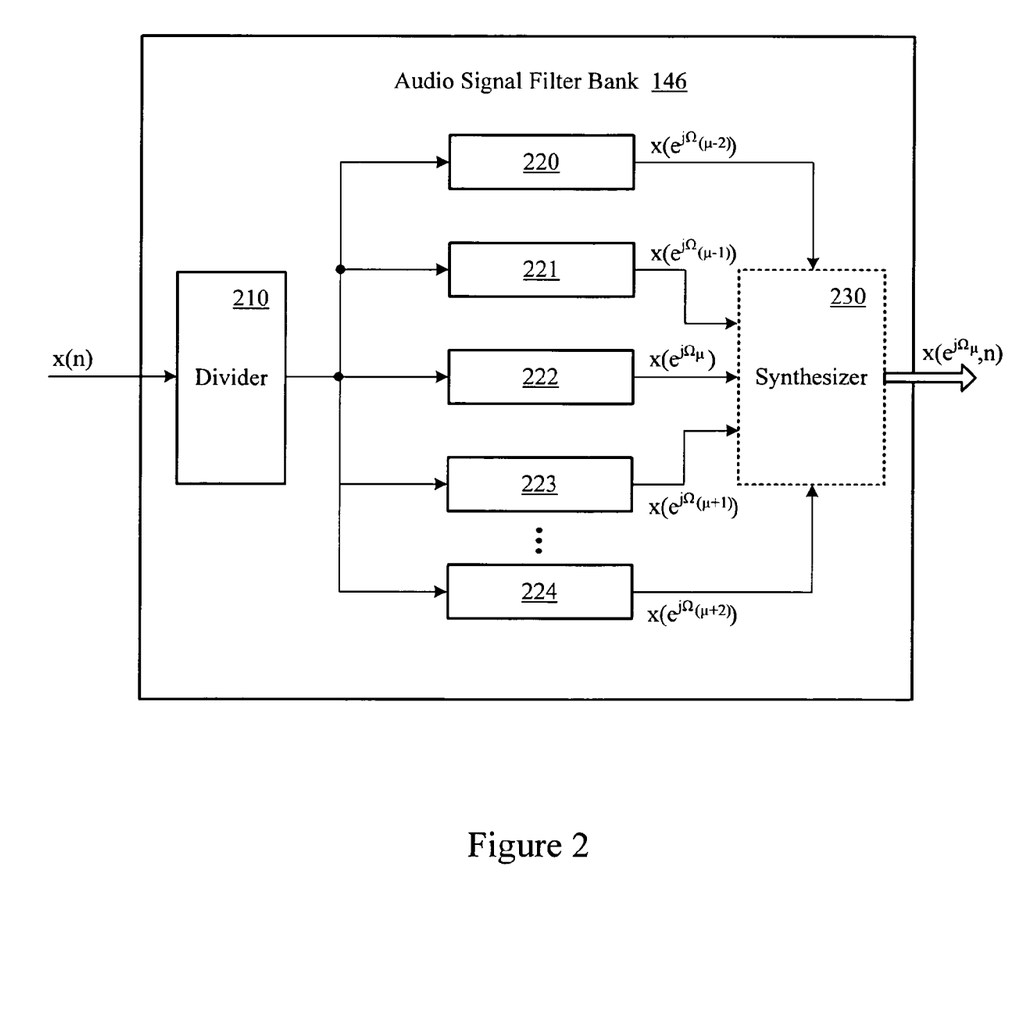
FIG. 2 is an audio signal filter bank.

FIG. 2 shows the microphone output filter bank 146, which for clarity, may include multiple sub-bands (e.g., five sub-bands are shown). A signal divider 210 may determine the number of sub-bands and the frequency range for each of the sub-bands. Multiple sub-band processing circuits 220-224 may perform processing for the respective sub-band frequency ranges. In some systems, the audio input filter bank 146 may include a common or different number of sub-bands and sub-band processing circuits. An optional sub-band synthesizer 230 may combine the sub-band output signals $X(e^{j\Omega_\mu}, n)$. In some systems, the sub-band synthesizer 230 is not used allowing the echo compensation filter 160 to receive the outputs of the sub-band processing circuits 220-224.

Echo compensation, detection of speech activity (whether the speaker is silent or is speaking) and suppression of residual echo may be performed in the sub-band ranges. After suppression of the residual echo in the sub-bands, a synthesizer 230 may synthesize the desired output signal, which may be transmitted to the remote communication party 134.

Figure 3:
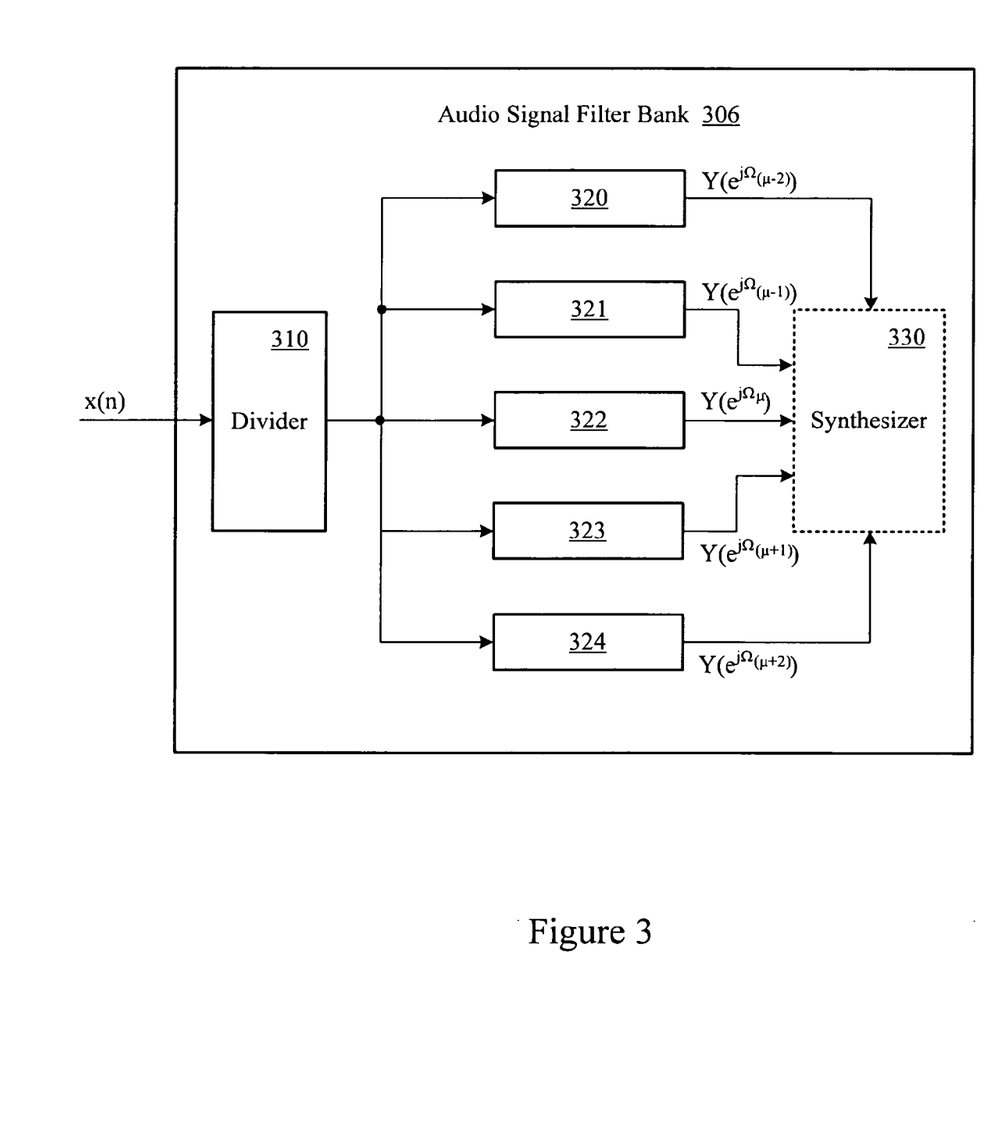
FIG. 3 is a microphone output filter bank.

FIG. 3 shows the audio input filter bank 306, which for clarity, may include more or less sub-bands (e.g., five sub-bands are shown). A signal divider 310 may determine the number of sub-bands and the frequency ranges for each of the sub-bands. A plurality of sub-band processing circuits 320-324 may process the respective sub-band frequency ranges. However, the audio input filter bank 146 may include a different number of sub-bands and corresponding sub-band processing circuits. A sub-band synthesizer 330 may combine the sub-band outputs for subsequent processing. In some systems, the sub-band synthesizer 330 is not used. In some of these systems, the echo compensation filter 160 may receive the outputs of the sub-band processing circuits 320-324.

The audio sub-band signals $X(e^{j\Omega_\mu}, n)$ generated by the audio input filter bank 146 may be filtered by an adaptive echo compensation filter 160. The filter coefficients of the echo compensation filter 160 may model the impulse response in the sub-bands. Adaptation of the filter coefficients may be based on a statistical process, such as a recursive least-squares process, normalized least mean squares process, proportional least mean squares process, and/or least mean squares process. An estimated echo signal $\hat{D}(e^{j\Omega_\mu}, n)$ in each sub-band may be obtained by processing the audio input sub-band signals $X(e^{j\Omega_\mu}, n)$ with the impulse response $\hat{H}(e^{j\Omega_\mu}, n)$ of the echo compensation filter 160.

The echo compensation filter 160 may include hardware and/or software, and may include a digital signal processor (DSP). The DSP may execute instructions that delay an input signal one or more additional times, track frequency components of a signal, filter a signal, and/or attenuate or boost an amplitude of a signal. Alternatively, the echo compensation filter 160 or DSP may be implemented as discrete logic or circuitry, a mix of discrete logic and a processor, or may be distributed over multiple processors or software programs.

The echo compensation filter 160 may generate the estimated echo signal $\hat{D}(e^{j\Omega_\mu}, n)$, which may correspond to an echo received by the remote communication party 134. A summing circuit 166 may combine (subtract) the estimated echo signal $\hat{D}(e^{j\Omega_\mu}, n)$ and the microphone sub-band signals $Y(e^{j\Omega_\mu}, n)$ to generate echo compensated signals $E(e^{j\Omega_\mu}, n)$ in each sub-band range.

A residual echo reduction circuit 170 may process the echo compensated signals $E(e^{j\Omega_\mu}, n)$ to suppress residual echoes. The residual echo reduction circuit 170 may be part of the residual echo processing circuitry 172. The residual echo reduction circuit 170 may include or may communicate with a noise reduction circuit 174 and may remove the background noise contribution b(n) of the echo compensated signals $E(e^{j\Omega_\mu}, n)$. Echo-suppressed sub-band output signals $\hat{S}(e^{j\Omega_\mu}, n)$ generated by the residual echo reduction circuit 170 may be synthesized to obtain a desired output signal. The output signal may comprise the sub-band signals transmitted to the remote communication party 134.

The residual echo reduction circuit 170 may use a Wiener filter implementation to estimate a power density spectrum of the residual echo $\hat{S}_{\epsilon\epsilon}(\Omega_\mu, n)$ and estimate the power density spectrum of the echo compensated sub-band signals $\hat{S}_{ee}(\Omega_\mu, n)$. The Wiener filter may exhibit the following filter response:

$$G(e^{j\Omega_\mu}, n) = \max\left\{G_{min}, 1 - \beta \frac{\hat{S}_{\epsilon\epsilon}(\Omega_\mu, n)}{\hat{S}_{ee}(\Omega_\mu, n)}\right\}.$$

A maximum damping value may be determined by the parameter $G_{min}$, and the sensitivity of the filter may be controlled by the parameter $\beta$. If $\beta > 1$, the damping may be greater than desired, which may dampen the desired signal below an predetermined level.

The filter characteristic or frequency response of the residual echo reduction filter 170 may be adjusted so that damping is sensitive ("aggressive") when local speaker 130 speech is absent. The echo reduction system 110 may distinguish speech signals produced by the local speaker 130 from signals transmitted by the loudspeaker 124 in the time-variant LRM environment 140. Such local speaker speech signals s(n) may be detected when the local speaker 130 is moving. Accordingly, the filter response of the residual echo reduction circuit 170 may adapt to the speech activity of the local speaker 130.

Figure 4:
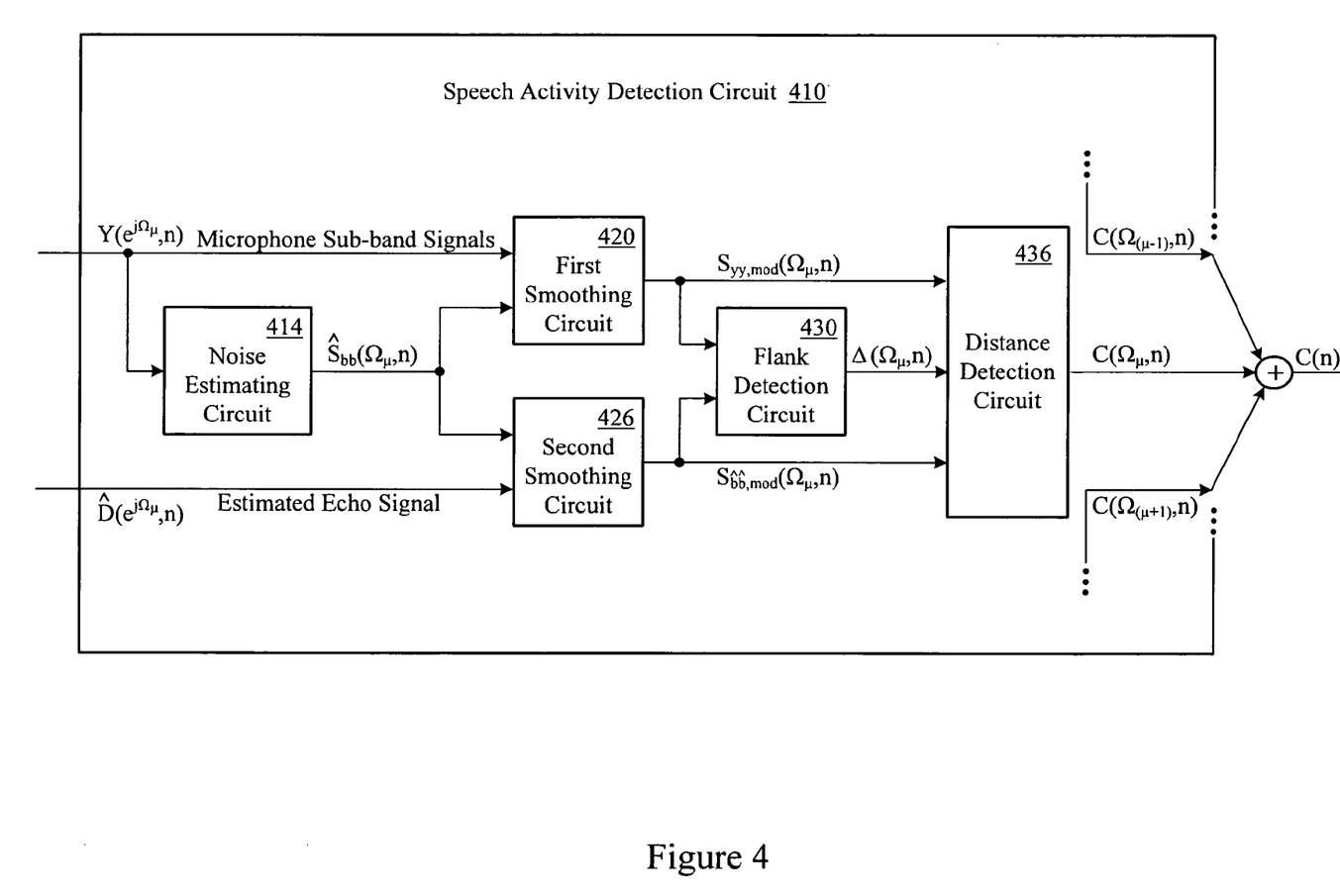
FIG. 4 is a speech activity detection circuit.

FIG. 4 shows a speech activity detection circuit 410, which may be part of or connected to the residual echo reduction circuit 170. A noise estimating circuit 414 may receive the microphone sub-band signals $Y(e^{j\omega_\mu}, n)$ output by the microphone output filter bank 150. The noise estimating circuit 414 may estimate the power density spectrum $\hat{S}_{bb}(\Omega_\mu, n)$ in the various sub-bands of the background noise b(n) acquired by the microphone 120. The noise estimating circuit 414 may estimate the power density spectrum $\hat{S}_{bb}(\Omega_\mu, n)$ using statistical methods, such as methods disclosed in an article entitled "An Efficient Algorithm to Estimate the Instantaneous SNR of Speech Signals," R. Martin, Eurospeech 1993, Berlin, Conf. Proceed., p. 1093-1096, September 1993, which is incorporated by reference.

Figure 5:
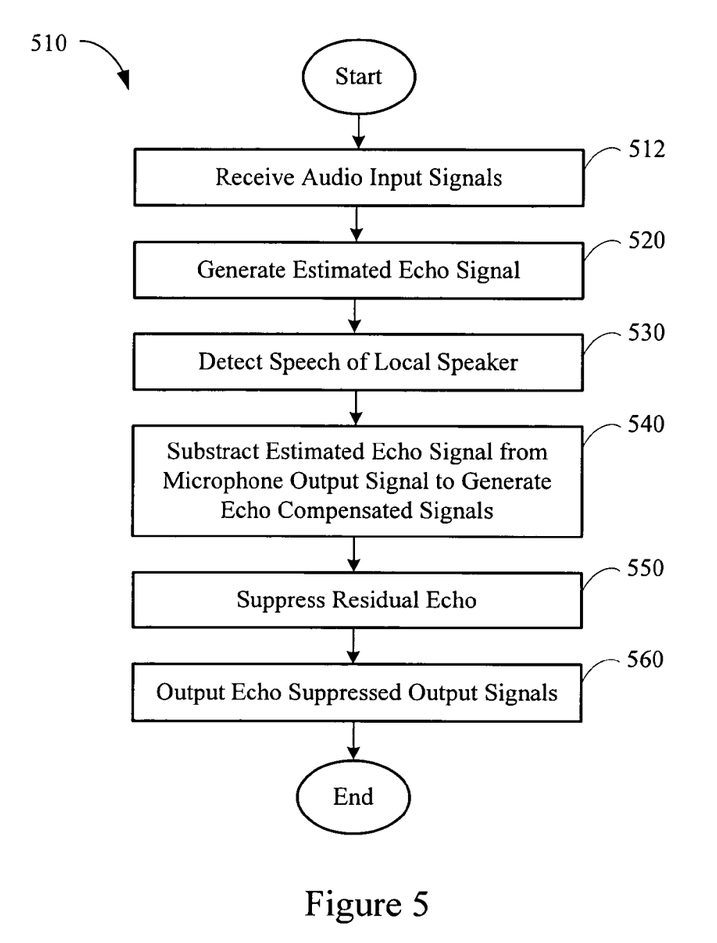
FIG. 5 is an echo suppression process.

FIG. 5 is a flow diagram showing an echo suppression. The echo compensation filter 160 may receive the audio input signals $X(e^{j\Omega_\mu}, n)$ (Act 512) and may generate estimated echo signals $\hat{D}(e^{j\Omega_\mu}, n)$ (Act 520). A speech activity detector 410 may detect speech of a local speaker (Act 530). A combining circuit 166 may generate a echo compensated signals $E(e^{j\Omega_\mu}, n)$ by subtracting the estimated echo signal $\hat{D}(e^{j\Omega_\mu}, n)$ from the microphone sub-band signals $Y(e^{j\Omega_\mu}, n)$ (Act 540). A residual echo reduction circuit 170 may suppress the residual echo in the echo compensated signals $E(e^{j\Omega_\mu}, n)$ based on the detected speech activity (Act 550), and may output echo suppressed sub-band output signals $\hat{S}(e^{j\Omega_\mu}, n)$ (Act 560) to a remote communication party 134.

FIG. 4 shows a first smoothing circuit 420 that may smooth the microphone sub-band signals $Y(e^{j\Omega_\mu}, n)$, and a second smoothing circuit 426 that may smooth the estimated echo signal $\hat{D}(e^{j\Omega_\mu}, n)$ generated by the echo compensation filter 160. The signals may be smoothed in frequency over predetermined M sub-bands $\mu=0, M-1$ according to the following equations:

$$S_{\hat{d}\hat{d},smooth}(\Omega_\mu, n) = \text{smooth}[\hat{D}(e^{j\Omega_0}, n), \hat{D}(e^{j\Omega_1}, n), \ldots, \hat{D}(e^{j\Omega_{M-1}}, n)]$$

$$S_{yy,smooth}(\Omega_\mu, n) = \text{smooth}[Y(e^{j\Omega_0}, n), Y(e^{j\Omega_1}, n), \ldots, Y(e^{j\Omega_{M-1}}, n)]$$

where $\Omega_\mu$ denotes the mid-frequency of the sub-band $\mu$, and the term "smooth" indicates a selected smoothing function. The pre-determined range of sub-bands may cover the range between about 200 Hz and about 3500 Hz. This range of frequencies may show significant speech signal power levels.

The smoothing circuits 420 and 426 may include a first order recursive filter to smooth the magnitudes, or the squares of the magnitudes of the signals. Smoothing may be performed in a positive direction ($\Omega_0$ to $\Omega_{M-1}$) or in a negative direction ($\Omega_{M-1}$ to $\Omega_0$) with respect to the frequency range. Smoothing may be performed according to the following equations:

$$\tilde{S}_{\hat{d}\hat{d},smooth}(\Omega_0, n) = \frac{1}{2}\left[|\hat{D}(e^{j\Omega_0}, n)|^2 + |\hat{D}(e^{j\Omega_1}, n)|^2\right]$$

$$\tilde{S}_{\hat{d}\hat{d},smooth}(\Omega_\mu, n) = \lambda_{Fre}\tilde{S}_{\hat{d}\hat{d},smooth}(\Omega_{\mu-1}, n) + (1 - \lambda_{Fre})|\hat{D}(e^{j\Omega_\mu}, n)|^2,$$

for $0 < \mu < M$ in the positive direction and $$S_{\hat{d}\hat{d},smooth}(\Omega_{M-1}, n) = \frac{1}{2}\left[\tilde{S}_{\hat{d}\hat{d},smooth}(\Omega_{M-2}, n) + \tilde{S}_{\hat{d}\hat{d},smooth}(\Omega_{M-1}, n)\right]$$

$$S_{\hat{d}\hat{d},smooth}(\Omega_\mu, n) = \lambda_{Fre}S_{\hat{d}\hat{d},smooth}(\Omega_{\mu+1}, n) + (1 - \lambda_{Fre})\tilde{S}_{\hat{d}\hat{d},smooth}(\Omega_\mu, n),$$

for $0 \leq \mu < M - 1$ in the negative direction.

For a sampling rate of about 11025 Hz and M=256 sub-bands, a smoothing parameter may be selected so that $0.2 \leq \lambda_{Fre} \leq 0.8$. Smoothing the microphone sub-band signals $Y(e^{j\Omega_\mu}, n)$ may yield a smoothed microphone spectrum $S_{yy,mod}(\Omega_\mu, n)$.

The smoothing circuits 420 and 426 may also receive the output $\hat{S}_{bb}(\Omega_\mu, n)$ of the noise estimating circuit 414, which may be based on the estimated power density spectrum of the microphone sub-band signals $Y(e^{j\Omega_\mu}, n)$. The smoothing circuits 420 and 426 may determine the maximum of the smoothed estimated echo spectrum according to the following equations:

$$S_{\hat{d}\hat{d},mod}(\Omega_\mu, n) = max\{S_{\hat{d}\hat{d},smooth}(\Omega_\mu, n), K_b\hat{S}_{bb}(\Omega_\mu, n)\}$$

$$S_{yy,mod}(\Omega_\mu, n) = max\{S_{yy,smooth}(\Omega_\mu, n), K_b\hat{S}_{bb}(\Omega_\mu, n)\}$$

where the background noise may be overestimated by $K_b$.

Satisfactory echo suppression results may be obtained when $2 \leq K_b \leq 16$. Weighting functions $w_1 S_{\hat{d}\hat{d},mod}(\Omega_\mu, n) = w_2 S_{yy,mod}(\Omega_\mu, n)$ may be chosen to determine a distance measure, which may indicate speech activity. The values of $w_1$ and $w_2$ may be selected depending on the value of $\Omega_\mu$. Alternatively, the values of $w_1$ and $w_2$ may be constants.

A flank detection circuit 430 may detect a strong level increase or decrease of the microphone sub-band signals $Y(e^{j\Omega_\mu}, n)$ or the estimated echo signal $\hat{D}(e^{j\Omega_\mu}, n)$. Strong temporary level changes may cause artifacts when calculating the distance measure for determining the speech activity of the local speaker. If no abrupt level changes are detected (i.e., temporarily relatively homogeneous signals are present), the smoothed output signals smooth $S_{yy,smooth}(\Omega_\mu, n)$ and $S_{\hat{d}\hat{d},smooth}(\Omega_\mu, n)$ generated by the smoothing circuits 420 and 426, respectively, may be used by the signal flank detection circuit 430 according the following equations:

$$\Delta(\Omega_\mu, n) = \begin{cases} 0, & \text{if } (S_{\hat{d}\hat{d},smooth}(\Omega_\mu, n) > K_\Delta S_{\hat{d}\hat{d},smooth}(\Omega_\mu, n-1)) \\ & \vee \left(S_{\hat{d}\hat{d},smooth}(\Omega_\mu, n) < \frac{1}{K_\Delta}S_{\hat{d}\hat{d},smooth}(\Omega_\mu, n-1)\right) \\ & \vee (S_{yy,smooth}(\Omega_\mu, n) > K_\Delta S_{yy,smooth}(\Omega_\mu, n-1)) \\ & \vee \left(S_{yy,smooth}(\Omega_\mu, n) < \frac{1}{K_\Delta}S_{yy,smooth}(\Omega_\mu, n-1)\right) \\ 1, & \text{else} \end{cases}$$

using a detection threshold of $4 \leq K_\Delta \leq 100$.

A distance detection circuit 436 may determine a spectrum distance measure based on $\Delta(\Omega_\mu, n)$, and the modified spectra $S_{\hat{d}\hat{d},mod}(\Omega_\mu, n)$ and $S_{yy,mod}(\Omega_\mu, n)$, calculated by the smoothing circuits 420 and 426 according to the following equations:

$$C(\Omega_\mu, n) =$$

$$\begin{cases} \Delta(\Omega_\mu, n)C_1, & \text{if } [S_{\hat{d}\hat{d},mod}(\Omega_\mu, n) > K_1 S_{yy,mod}(\Omega_\mu, n)], \\ \Delta(\Omega_\mu, n)C_2, & \text{if } [K_2 S_{yy,mod}(\Omega_\mu, n) \leq S_{\hat{d}\hat{d},mod}(\Omega_\mu, n) \leq K_1 S_{yy,mod}(\Omega_\mu, n)], \\ \Delta(\Omega_\mu, n)C_3, & \text{if } [K_3 S_{\hat{d}\hat{d},mod}(\Omega_\mu, n) \leq S_{yy,mod}(\Omega_\mu, n) \leq K_4 S_{\hat{d}\hat{d},mod}(\Omega_\mu, n)], \\ \Delta(\Omega_\mu, n)C_4, & \text{if } [S_{yy,mod}(\Omega_\mu, n) > K_4 S_{\hat{d}\hat{d},mod}(\Omega_\mu, n)], \\ 0, & \text{else.} \end{cases}$$

The detection threshold values may be selected as: $K_1=16$, $K_2=4$, $K_3=4$, and $K_4=16$. The distances $C(\Omega_\mu, n)$ may be specified by detection parameters $C_1=-0.4$, $C_2=0.1$, $C_3=0.1$, and $C_4=0.6$. Large positive values of the spectrum distance measure $C(\Omega_\mu, n)$ may indicate that the power density of the microphone spectrum dominates the power density of the estimated echo. If the power density of the estimated echo significantly exceeds the power density of the microphone spectrum, strong changes in the LRM system 140 may be indicated, which may result in a high negative cost parameter $C_1$.

The determination of both $\Delta(\Omega_\mu, n)$ and $C(\Omega_\mu, n)$ may be restricted to sub-bands that show a significant power of speech signals. This may indicate that the sub-bands may be restricted to $\mu \in [\mu_{start}, \mu_{end}]$ where $\mu_{start}$ and $\mu_{end}$ correspond to a frequency range of about 200 Hz to about 300 Hz. A summing circuit 440 may sum the results $C(\Omega_\mu, n)$ for the individual sub-bands, where $$C(n) = \sum_{\mu=\mu_{start}}^{\mu_{end}} C(\Omega_\mu, n).$$

Smoothing over a pre-determined time interval may be performed to obtain a smoothed distance measure $\overline{C}(n)$.

Figure 6:
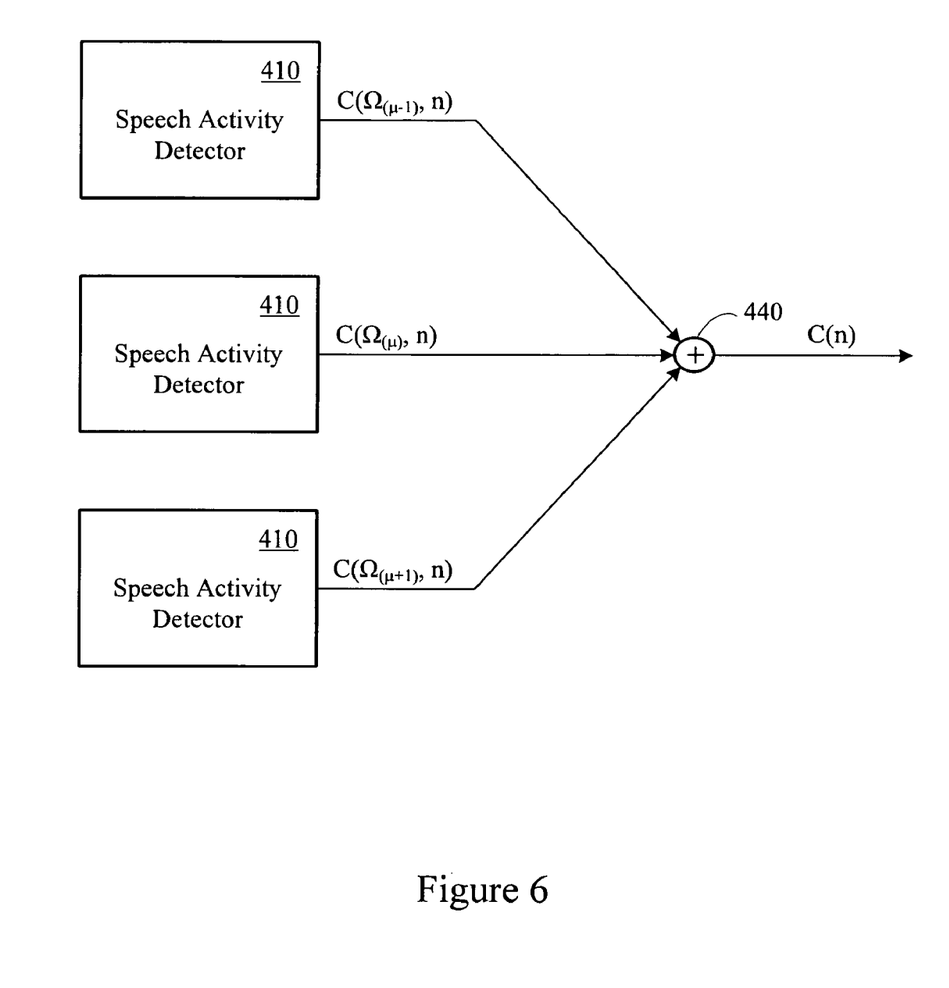
FIG. 6 shows multiple sub-bands of a speech activity detection circuit.

FIG. 6 shows multiple sub-band speech activity detector circuits 410, which deliver on input to the summing circuit 440. Although three sub-bands for the speech activity detectors 410 are shown, a different number of sub-band speech activity detectors may be included.

Based upon the detected speech activity as measured by $\overline{C}(n)$, the summed output C(n) of the distance detection circuit 436 may be used to adapt the filter characteristic of the residual echo reduction circuit 170. If no speech activity is detected based on the smoothed distance measure $\overline{C}(n)$, residual echo filtering may be performed based on the square of the magnitude of the estimated echo signal $\hat{D}(e^{j\Omega_\mu}, n)$ or the maximum of $|\hat{D}(e^{j\Omega_\mu}, n)|^2$ and the power density of the residual echo $\hat{S}_{\epsilon\epsilon}(\Omega_\mu, n)$.

Double-talk may occur when both the local speaker 130 and the remote communication party 134 speak simultaneously, and significant speech activity is detected. When double-talk occurs, a Wiener filter with a time-dependent filter parameter β(n) may be used. The residual echo reduction circuit 170 may process residual echo according to the following equations:

$$G_{mod}(e^{j\Omega_\mu},n) = \max\{G_{min}, \tilde{G}_{mod}(e^{j\Omega_\mu},n)\} \text{ where}$$

$$G(e^{j\Omega_\mu},n) = \begin{cases} 1-\beta(n)\dfrac{\hat{S}_{\varepsilon\varepsilon}(\Omega_\mu,n)}{\hat{S}_{ee}(\Omega_\mu,n)}, & \text{if } \overline{C}(n) > C_{thres} \\ 1-\beta(n)\dfrac{\max\{\hat{S}_{\varepsilon\varepsilon}(\Omega_\mu,n),|\hat{D}(e^{j\Omega_\mu},n)|^2\}}{\hat{S}_{ee}(\Omega_\mu,n)}, & \text{else} \end{cases}$$

or $$G(e^{j\Omega_\mu},n) = \begin{cases} 1-\beta(n)\dfrac{\hat{S}_{\varepsilon\varepsilon}(\Omega_\mu,n)}{\hat{S}_{ee}(\Omega_\mu,n)}, & \text{if } \overline{C}(n) > C_{thres} \\ 1-\beta(n)\dfrac{|\hat{D}(e^{j\Omega_\mu},n)|^2}{\hat{S}_{ee}(\Omega_\mu,n)}, & \text{else.} \end{cases}$$

The mid-frequency of the sub-band μ may be denoted by $\Omega_\mu$, and $\hat{S}_{ee}(\Omega_\mu,n)$ and $\hat{S}_{\varepsilon\varepsilon}(\Omega_\mu,n)$ may denote the estimated power density of the echo compensated signal and the estimated power density of the residual echo, respectively. The discrete time index may be denoted by n, and β(n) may be a filter parameter based upon the detected speech activity. $\overline{C}(n)$ may be a measure for the detected speech activity, and $C_{thres}$ may be a predetermined threshold value. The filter characteristic of the residual echo filter circuit 170 may alternatively be limited by replacing one of the above characteristics by max $[G_{min}, G(e^{j\Omega_\mu},n)]$ with a pre-determined value $G_{min}$.

The parameter β(n) may control the sensitivity of the filter based on the smoothed distance measure according to the following equation:

$$\beta(n) = \begin{cases} \beta_1, & \text{if } \overline{C}(n) > C_{thres} \\ \beta_2 > \beta_1, & \text{else.} \end{cases}$$

where suitable values for the β-parameters may be $\beta_1=1$ and $\beta_2=1000$. A predetermined threshold value, $C_{thres}$, may indicate the presence of significant speech activity from the local speaker 130. Echo suppression may be limited by the value of $G_{min}$, e.g., $G_{min}=0.1$.

If the estimated power density of the echo compensated signal greatly exceeds the estimated power density of the residual echo, suppression of the residual echo may be minimized so that the microphone output signal is not significantly modified. In contrast, if the estimated power density of the residual echo exceeds the estimated power density of the echo compensated signal, compensated signal may be filtered aggressively.

Suppressing the residual echo in the echo compensated signal may include filtering the echo compensated signal with a filter having the following frequency response:

$$G(e^{j\Omega_\mu},n) = 1 - \beta(n)\dfrac{\hat{S}_{\varepsilon\varepsilon}(\Omega_\mu,n)}{\hat{S}_{ee}(\Omega_\mu,n)}$$

where $\hat{S}_{ee}(\Omega_\mu,n)$ and $\hat{S}_{\varepsilon\varepsilon}(\Omega_\mu,n)$ denote the estimated power density of the echo compensated signal. The estimated power density of the residual echo and β(n) may be a filter parameter based on the detected speech activity.

The power density spectrum $\hat{S}_{ee}(\Omega_\mu,n)$ of the echo compensated sub-band microphone signals $E(e^{j\Omega_\mu},n)$ may be recursively determined according to the following equation:

$$\hat{S}_{ee}(\Omega_\mu,n) = \lambda_e \hat{S}_{ee}(\Omega_\mu,n-1) + (1-\lambda_e)|E(e^{j\Omega_\mu},n)|^2$$

where a smoothing parameter may be chosen as $0 \leq \lambda_e \leq 1$.

Further, the power density spectrum $\hat{S}_{\varepsilon\varepsilon}(\Omega_\mu,n)$ of the residual echo may be determined according to the following equation:

$$\hat{S}_{\varepsilon\varepsilon}(\Omega_\mu,n) = \hat{S}_{xx}(\Omega_\mu,n)|\hat{H}_\Delta(e^{j\Omega_\mu},n)|^2$$

where the estimated echo compensation $\hat{H}_\Delta(e^{j\Omega_\mu},n)$ provided by the echo compensation filter 160 may be calculated by methods described in an article entitled "Step-Size Control in Subband Echo Cancellation Systems," G. Schmidt, IWANEC 1999, Pocona Manor, Pa., USA, Conf. Proceed., p. 116-119, 1999, which is incorporated by reference.

The estimated power density spectrum $\hat{S}_{xx}(\Omega_\mu,n)$ of the audio signal output of the loudspeaker 124 may be calculated according to the following equation:

$$\hat{S}_{xx}(\Omega_\mu,n) = \lambda_x \hat{S}_{xx}(\Omega_\mu,n-1) + (1-\lambda_x)|X(e^{j\Omega_\mu},n)|^2$$

where the smoothing parameter may be chosen as $0 \leq \lambda_x \leq 1$.

Figure 7:
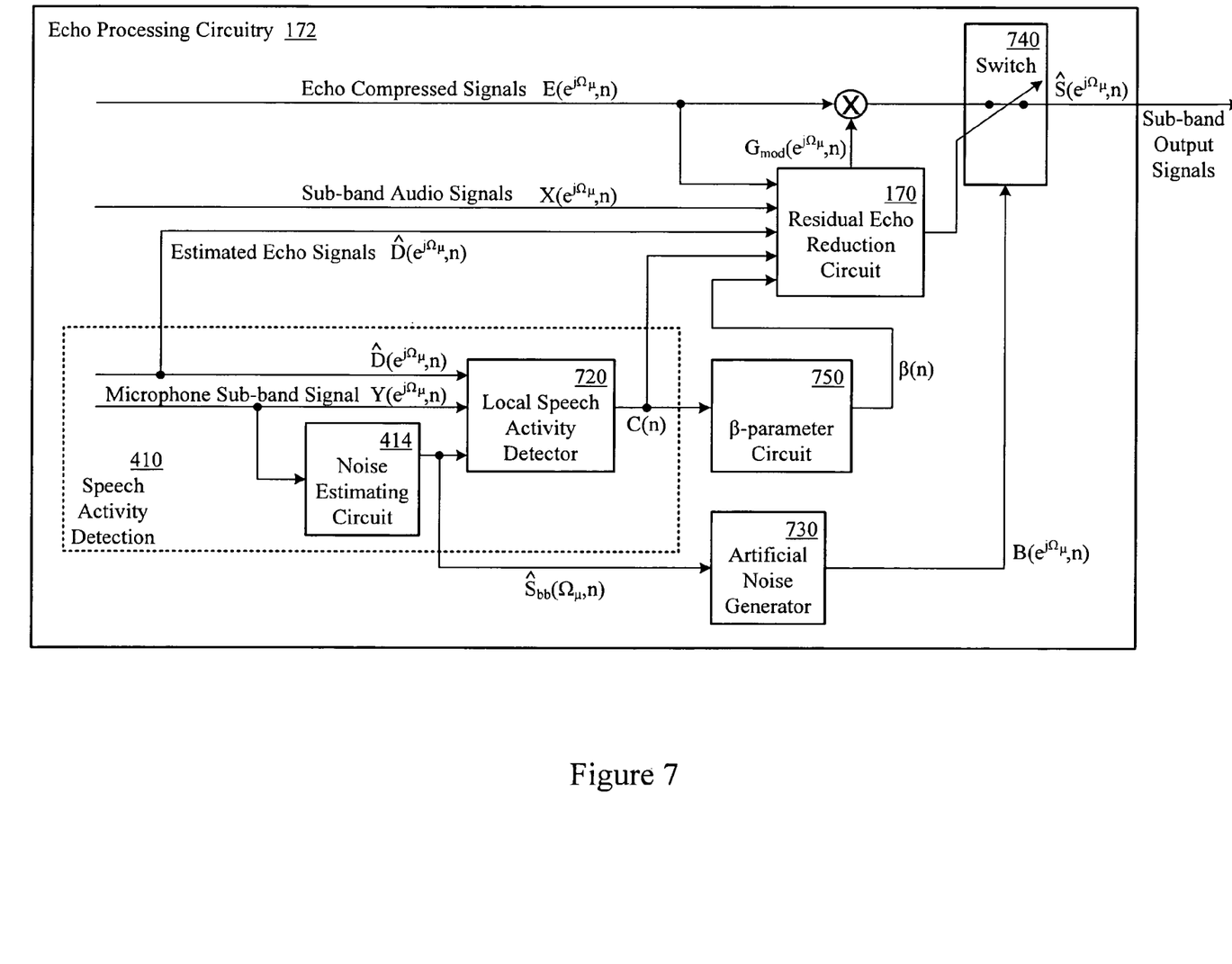
FIG. 7 shows an echo processing circuit.

FIG. 7 shows more of the echo processing circuitry 172. The residual echo reduction circuit 170 may filter the echo compensated signals $E(e^{j\Omega_\mu},n)$. The filter characteristics $G_{mod}(e^{j\Omega_\mu},n)$ of the residual echo reduction circuit 170 may be adapted based on the results of the speech activity detection circuit 410.

A β-parameter circuit 750 may receive input from the local speech activity detector 720 and determine an appropriate value of β. The residual reduction circuit 170 may utilize the β-parameter value.

A local speech activity detector 720 may include the first and second smoothing circuit 420 and 426 shown in FIG. 4. The local speech activity detector 720 may receive the estimated echo signals $\hat{D}(e^{j\Omega_\mu},n)$ for the sub-bands, the microphone sub-band signals $Y(e^{j\Omega_\mu},n)$, and the output of the noise estimating circuit 414. The power density spectrum of the background noise $\hat{S}_{bb}(\Omega_\mu,n)$ obtained by the noise estimating circuit 414 may provide input to an artificial noise or "comfort noise" generator 730.

The artificial noise generator 730 may generate artificial noise with substantially the same statistical power distribution as the background noise. The artificially generated noise signal or "comfort noise" signal $B(e^{j\Omega_\mu},n)$ may be generated when the sub-band output signals $\hat{S}(e^{j\Omega_\mu},n)$ generated by the residual echo reduction circuit 170 has a power density below that of the remaining background noise. A switch 740 may allow the system to select between the comfort noise signal $B(e^{j\Omega_\mu},n)$ and the sub-band output signals $\hat{S}(e^{j\Omega_\mu},n)$ to avoid an abrupt change of the background noise transmitted to the remote communication party 134. The residual echo reduction circuit 170 may determine whether to output the comfort noise signal.

The desired signal or sub-band output signal $\hat{S}(e^{j\Omega_\mu},n)$ transmitted to the remote communication party 134 may be synthesized from the sub-band signals according to the following equation:

$$\hat{S}(e^{j\Omega_\mu},n) = \begin{cases} E(e^{j\Omega_\mu},n)G_{mod}(e^{j\Omega_\mu},n), & \text{if no comfort noise is to be output} \\ B(e^{j\Omega_\mu},n), & \text{if comfort noise only is to be output} \end{cases}$$

where $E(e^{j\Omega_\mu},n)$ and $B(e^{j\Omega_\mu},n)$ may denote the echo compensated signal and the artificial noise signal in sub-bands, respectively.

Figure 8:
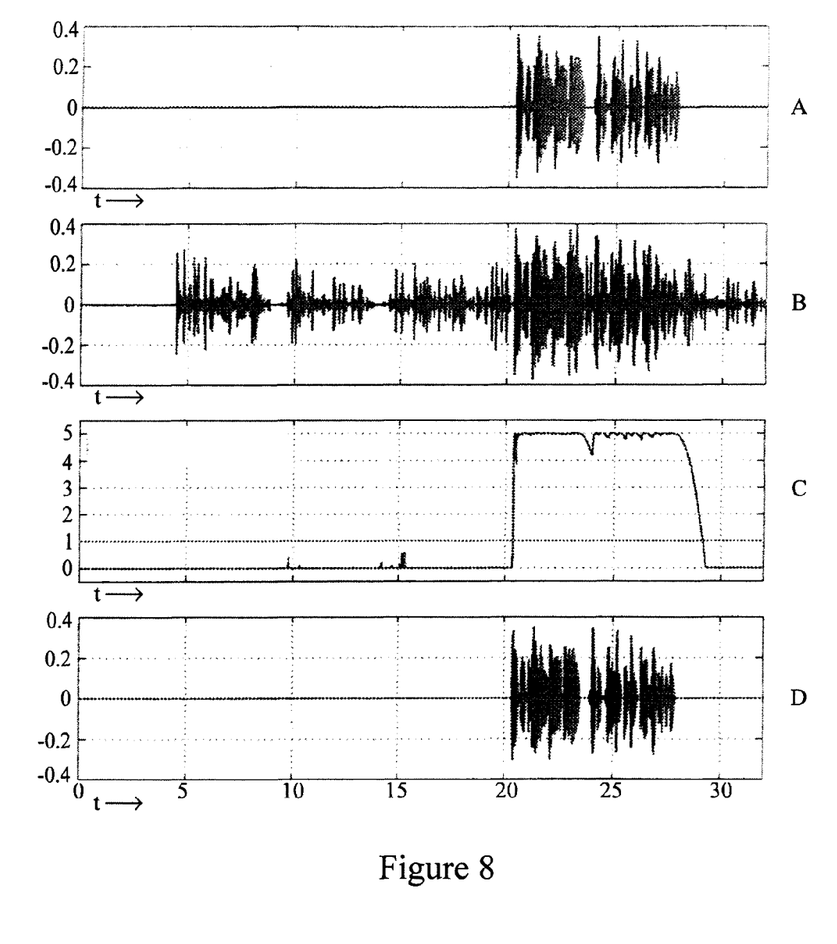
FIG. 8 shows speech signals processed by an echo reduction system.

FIG. 8 illustrates simulated waveforms. For each of the four panels, the abscissa shows the power of a signal, and the ordinate shows the time in seconds. Panel A shows a simulated speech signal of the local speaker 130, and panel B shows a corresponding microphone output signal. The microphone output signal may include the speech signal as well as an echo contribution.

The LRM environment 140 was changed by simulating movement of the local speaker 130 at a time t=5 seconds, and again at a time t=15 seconds. Panel D shows the addition of double talk from a time t=20.5 seconds to a time t=27.5 seconds.

Panel C shows the smoothed distance measure $\overline{C}(n)$ as a result of the speech activity detection circuit 410. As shown by the waveform, the smoothed distance measure $\overline{C}(n)$ does not respond or responds slightly to the speaker's movements. In particular, $\overline{C}(n)$ may be below the threshold $C_{thres}$=1. Panel C may show significant residual echo suppression while the speaker moves. During the period of time when double-talk exists, the smoothed distance measure $\overline{C}(n)$ may indicate speech activity of the local speaker 130. As a result, the desired output signal $\hat{S}(e^{j\Omega_\mu},n)$ may show a correspondence with the simulated speech signal of the local speaker.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory, or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds), and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular or wireless phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for reducing an echo and/or a residual echo in a microphone output signal, the method comprising:
    generating an estimated echo signal based on received audio input signals;
    subtracting the estimated echo signal from the microphone output signal to generate an echo compensated signal;
    detecting speech activity of a local speaker based on the microphone output signal and the estimated echo signal; and
    suppressing the residual echo in the echo compensated signal based on the detected speech activity to obtain an echo suppressed output signal;
    wherein detecting the speech activity of the local speaker comprises:
    smoothing sub-band microphone signals derived from the microphone output signal in frequency to generate respective smoothed sub-band microphone signals;
    smoothing estimated sub-band echo signals derived from the estimated echo signal in frequency to generate respective smoothed estimated sub-band echo signals; and
    determining for the respective sub-bands, a distance between the smoothed sub-band microphone signals and the smoothed estimated sub-band echo signals.

2. The method according to claim 1, comprising: separating the microphone output signal into a plurality of sub-band microphone signals, and separating the audio input signal into a plurality of estimated sub-band echo signals.

3. The method according to claim 2, where generating the echo compensated signal, detecting speech activity, and suppressing the residual echo are performed for the respective sub-band ranges.

4. The method according to claim 1, where suppressing the residual echo is based on the determined distance between the smoothed sub-band microphone signals and the smoothed estimated sub-band echo signals for the respective sub-bands.

5. The method according to claim 1, where smoothing the estimated sub-band echo signals is performed using a first order recursive filter.

6. The method according to claim 1, further comprising:
    estimating a power density spectrum of background noise present in the microphone output signal; where smoothing the sub-band microphone signals includes recursively filtering a power density spectrum of the respective sub-band microphone signals to generate a smoothed power density spectrum of the respective sub-band microphone signals; and
    where smoothing the estimated sub-band echo signals includes recursively filtering a power density spectrum of the respective estimated sub-band echo signals to obtain a smoothed power density spectrum of the respective estimated sub-band echo signals.

7. The method according to claim 1, further comprising:
estimating a power density of the echo compensated signal; and
estimating a power density of the residual echo, where suppressing the residual echo in the echo compensated signal is based on the estimated power density of the echo compensated signal and the estimated power density of the residual echo.

8. The method according to claim 1, further comprising:
determining a power density of the echo-suppressed output signal;
determining a power density of background noise present in the microphone output signal;
comparing the power density of the echo-suppressed output signal with the power density of the background noise;
transmitting the echo-suppressed output signal to a remote party if the power density of the echo-suppressed output signal exceeds the power density of the background noise; and
transmitting artificial noise to the remote party if the power density of the echo suppressed output signal does not exceed the power density of the background noise.

9. A method for reducing an echo and/or a residual echo in a microphone output signal, the method comprising:
separating the microphone output signal into a plurality of sub-band microphone signals;
separating an audio input signal into a plurality of sub-band audio input signals;
for each sub-band:
estimating a power density spectrum of background noise present in the microphone output signal;
generating an estimated echo signal of the audio input signal based on the audio input signal;
subtracting the estimated echo signal from the microphone output signal to generate an echo compensated signal;
detecting speech activity of a local speaker based on the microphone output signal and the estimated echo signal; and
suppressing residual echo in the echo compensated signal based on the detected speech activity to obtain an echo suppressed output signal;
where detecting the speech activity of the local speaker comprises:
smoothing the sub-band microphone signals in frequency to generate respective smoothed sub-band microphone signals;
smoothing the estimated sub-band echo signals in frequency to generate respective smoothed estimated sub-band echo signals; and
determining for the respective sub-bands, a distance between the smoothed sub-band microphone signals and the smoothed estimated sub-band echo signals; and
where smoothing the sub-band microphone signals includes recursively filtering a power density spectrum of the respective sub-band microphone signals to generate a smoothed power density spectrum of the respective sub-band microphone signals; and where smoothing the estimated sub-band echo signals includes recursively filtering a power density spectrum of the respective estimated sub-band echo signals to obtain a smoothed power density spectrum of the respective estimated sub-band echo signals where determining the distance between the smoothed sub-band microphone signals and the smoothed estimated sub-band echo signals further comprises:
determining in each sub-band a maximum of the smoothed power density spectrum of the sub-band microphone signals and the estimated power density spectrum of the background noise enhanced by a first predetermined noise overestimate factor, to obtain a modified microphone power density spectrum;
determining in each sub-band the maximum of the smoothed power density spectrum of the estimated sub-band echo signals and the estimated power density spectrum of the background noise enhanced by a second predetermined noise overestimate factor, to obtain a modified echo power density spectrum;
comparing the modified microphone power density spectrum and the modified echo power density spectrum to obtain a spectrum distance measure; and
suppressing the residual echo in the respective echo compensated sub-band signals based on the spectrum distance measure.

10. A method for reducing an echo and/or a residual echo in a microphone output signal, the method comprising:
generating an estimated echo signal based on received audio input signals;
subtracting the estimated echo signal from the microphone output signal to generate an echo compensated signal;
estimating a power density of the echo compensated signal;
detecting speech activity of a local speaker based on the microphone output signal and the estimated echo signal; and
suppressing the residual echo in the echo compensated signal based on the detected speech activity to obtain an echo suppressed output signal estimating a power density of the residual echo, where suppressing the residual echo in the echo compensated signal is based on the estimated power density of the echo compensated signal and the estimated power density of the residual echo where suppressing the residual echo in the echo compensated signal further comprises filtering the echo compensated signal with a filter having a frequency response of:

$$G(e^{j\Omega_\mu}, n) = 1 - \beta(n) \frac{\hat{S}_{\varepsilon\varepsilon}(\Omega_\mu, n)}{\hat{S}_{ee}(\Omega_\mu, n)}$$

where a mid-frequency of the sub-band $\mu$ is denoted by $\Omega_\mu$ $\hat{S}_{\varepsilon\varepsilon}(\Omega_\mu,n)$ and $\hat{S}_{ee}(\Omega_\mu,n)$ are the estimated power density of the echo compensated signal and the estimated power density of the residual echo, respectively, n is the discrete time index, and $\beta(n)$ is a filter parameter depending on the detected speech activity.

11. A method for reducing an echo and/or a residual echo in a microphone output signal, the method comprising:
generating an estimated echo signal based on received audio input signals;
subtracting the estimated echo signal from the microphone output signal to generate an echo compensated signal;
estimating a power density of the echo compensated signal;
detecting speech activity of a local speaker based on the microphone output signal and the estimated echo signal; and
suppressing the residual echo in the echo compensated signal based on the detected speech activity to obtain an echo suppressed output signal estimating a power density of the residual echo, where suppressing the residual echo in the echo compensated signal is based on the estimated power density of the echo compensated signal and the estimated power density of the residual echo;

wherein suppressing the residual echo in the echo compensated signal further comprises filtering the echo compensated signal with a filter having a frequency response of:

$$G(e^{j\Omega_\mu}, n) = \begin{cases} 1 - \beta(n)\dfrac{\hat{S}_{\varepsilon\varepsilon}(\Omega_\mu, n)}{\hat{S}_{ee}(\Omega_\mu, n)}, & \text{if } \overline{C}(n) > C_{thres} \\ 1 - \beta(n)\dfrac{\max\{\hat{S}_{\varepsilon\varepsilon}(\Omega_\mu, n), |\hat{D}(e^{j\Omega_u}, n)|^2\}}{\hat{S}_{ee}(\Omega_\mu, n)}, & \text{else} \end{cases}$$

or $$G(e^{j\Omega_\mu}, n) = \begin{cases} 1 - \beta(n)\dfrac{\hat{S}_{\varepsilon\varepsilon}(\Omega_\mu, n)}{\hat{S}_{ee}(\Omega_\mu, n)}, & \text{if } \overline{C}(n) > C_{thres} \\ 1 - \beta(n)\dfrac{|\hat{D}(e^{j\Omega_u}, n)|^2}{\hat{S}_{ee}(\Omega_\mu, n)}, & \text{else} \end{cases}$$

where $\overline{C}(n)$ is a measure of the detected speech activity; and $C_{thres}$ is a predetermined threshold.

12. A non-transitory computer-readable storage medium having processor executable instructions to reduce an echo and/or a residual echo in a microphone output signal, by performing the acts of: generating an estimated echo signal; subtracting the estimated echo signal from the microphone output signal to generate an echo compensated signal; detecting speech activity of a local speaker based on the microphone output signal and the estimated echo signal; and suppressing the residual echo in the echo compensated signal based on the detected speech activity to obtain an echo suppressed output signal wherein detecting the speech activity of the local speakers comprises: smoothing sub-band microphone signals derived from the microphone output signal in frequency to generate respective smoothed sub-band microphone signals; smoothing the estimated sub-band echo signals derived from the estimated echo signal in frequency to generate respective smoothed estimated sub band echo signals; and determining for the respective sub-bands, a distance between the smoothed sub-band microphone signals and the smoothed estimated sub-band echo signals.

13. The non-transitory computer-readable storage medium of claim 12, further comprising processor executable instructions to cause a processor to perform the acts of separating the microphone output signal into a plurality of sub-band microphone signals, and separating the estimated echo signal into a plurality of estimated sub-band echo signals.

14. The non-transitory computer-readable storage medium of claim 13, further comprising processor executable instructions to cause a processor to perform the acts of generating the echo compensated signal, detecting speech activity and suppressing the residual echo, all in the respective sub-band ranges.

15. A system for reducing an echo and/or a residual echo in a microphone output signal, the microphone receiving audio input signals, the system comprising:

an echo compensation filter configured to receive the audio input signals and generate an estimated echo signal;

a speech activity detector configured to detect speech of a local speaker;

a combining circuit configured to generate an echo compensated signal by subtracting the estimated echo signal from the microphone output signal; and a residual echo reduction circuit configured to suppress the residual echo in the echo compensated signal based on the detected speech activity, and output an echo suppressed output signal wherein the speech activity detector further comprises:
a first smoothing circuit configured to smooth sub-band microphone signals derived from the microphone output signal in frequency to generate respective smoothed sub-band microphone signals;

a second smoothing circuit configured to smooth estimated sub-band echo signals derived from the estimated echo signal in frequency to generate respective smoothed estimated sub-band echo signals;

and a distance detection circuit configured to determine for the respective sub-bands, a distance between the smoothed sub-band microphone signals and the smoothed estimated sub-band echo signals.

16. The system according to claim 15, comprising:
a microphone output filter bank configured to separate the microphone output signal into a plurality of sub-band microphone signals; and an audio input filter bank configured to separate the audio input signals into a plurality of sub-band audio signals to facilitate generation of a plurality of sub-band estimated echo signals.

17. The system according to claim 16, where the estimated echo signal, the echo compensated signal, the detected speech of the local speaker and suppression of the residual echo are processed for the respective sub-band ranges.

18. The system according to claim 15, where the residual echo is suppressed based on the determined distance between the smoothed sub-band microphone signals and the smoothed estimated sub-band echo signals for the respective sub-bands.

19. The system according to claim 15, further comprising a first order recursive filter configured to smooth the estimated sub-band echo signals.

20. The system according to claim 15, further comprising:
logic configured to estimate a power density of the echo compensated signal; and logic configured to estimate a power density of the residual echo, where the residual echo in the echo compensated signal is suppressed based on the estimated power density of the echo compensated signal and the estimated power density of the residual echo.

21. The system according to claim 15, further comprising:
logic configured to determine a power density of the echo-suppressed output signal;

logic configured to determine a power density of background noise present in the microphone output signal;

a noise generator configured to generate artificial noise;

comparing logic configured to compare the power density of the echo-suppressed output signal with the power density of the background noise; and where the echo-suppressed output signal is transmitted to a remote party if the power density of the echo-suppressed output signal exceeds the power density of the background noise, and artificial noise is transmitted to the remote party if the power density of the echo-suppressed output signal does not exceed the power density of the background noise.

22. A system for reducing an echo and/or a residual echo in a microphone output signal, the microphone receiving audio input signals, the system comprising:
- an echo compensation filter configured to receive the audio input signals and generate an estimated echo signal;
- a speech activity detector configured to detect speech of a local speaker;
- a combining circuit configured to generate an echo compensated signal by subtracting the estimated echo signal from the microphone output signal;
- a residual echo reduction circuit configured to suppress the residual echo in the echo compensated signal based on the detected speech activity, and output an echo suppressed output signal;
- logic configured to estimate a power density of the echo compensated signal; and
- logic configured to estimate a power density of the residual echo, where the residual echo in the echo compensated signal is suppressed based on the estimated power density of the echo compensated signal and the estimated power density of the residual echo where the residual echo reduction circuit includes a filter configured to suppress the residual echo in the echo compensated signal by filtering the echo compensated signal, the filter having a frequency response of:

$$G(e^{j\Omega_\mu}, n) = 1 - \beta(n) \frac{\hat{S}_{\varepsilon\varepsilon}(\Omega_\mu, n)}{\hat{S}_{ee}(\Omega_\mu, n)}$$

where a mid-frequency of the sub-band $\mu$ is denoted by $\Omega_\mu$ $\hat{S}_{\varepsilon\varepsilon}(\Omega_\mu,n)$ and $\hat{S}_{ee}(\Omega_\mu,n)$ are the estimated power density of the echo compensated signal and the estimated power density of the residual echo, respectively, n is the discrete time index, and $\beta(n)$ is a filter parameter depending on the detected speech activity.

* * * * *